United States Patent Office 3,508,887
Patented Apr. 28, 1970

3,508,887

COUPLED FERROMAGNETIC FOILS OR LAYERS

Pierre Georges Henri Chezel, René Fernand Victor Girard, Georges Grunberg, and Louis Neel, Grenoble, France, assignors to Societe Industrielle Bull-General Electric (Societe Anonyme), Paris, France No Drawing. Filed Mar. 24, 1966, Ser. No. 536,997
Claims priority, application France, Apr. 2, 1965, 11,755
Int. Cl. B32b 15/00
U.S. Cl. 29—183.5 9 Claims

ABSTRACT OF THE DISCLOSURE

Arrangement of coupled ferromagnetic thin films comprising a nonmagnetic support, a first thin film and a second thin film deposited upon said support and made of a ferromagnetic alloy of the same metals, said films being separated from each other by a thin conductive nonferromagnetic intermediate layer and exhibiting different coercive forces, said second film is of a homogeneous composition having a magnetostriction of substantially zero value, while the first film is of a nonhomogeneous composition varying in the direction of its thickness on either side of a mean value corresponding to the alloy having a magnetostriction of substantially zero value, so that said first film exhibits a magnetostriction of substantially zero value and a coercive force which is higher than that of said second film. In the disclosed method of making the composite structure, the films are deposited on the layer by electrolysis.

This invention relates to coupled thin foils or layers, i.e., to systems of thin ferromagnetic layers having different coercive fields, separated by a nonferromagnetic conductive layer and thus coupled by a field, called the "internal coupling field," which systems are described, for example, in "1964 Proceedings of the Intermag Conference" (published by I.E.E.E. of New York), pages 16-1-1 to 16-1-4, and the invention is concerned more especially, but not exclusively, with coupled thin ferromagnetic layers of this type which are intended to be employed as memory elements for nondestructive reading, because it is in this respect that its application appears to afford the greatest advantage.

The invention has above all the object of adapting the said coupled thin foils or layers to respond better than hitherto to the various practical requirements, notably in regard to the reduced value of the coercive field of the layer having the higher coercive field, and the thickness of the ferromagnetic layers.

In accordance with a main feature, the invention provides a system of coupled ferromagnetic layers which comprises two thin layers of ferromagnetic alloy having substantially zero magnetostriction separated by a thin nonferromagnetic conductive layer, and characterised by the fact that the two thin ferromagnetic layers consist of two alloys of the same metals, having different mean compositions and different coercive fields.

In the preferred embodiments, there may be employed, in addition to the said main feature, one or more of the following features:

The three thin layers are formed by electrolytic deposition;

The two ferromagnetic alloys are alloys of nickel and iron;

The mean composition of the two ferromagnetic layers is 82–83% of nickel and 18–17% of iron;

One of the two thin ferromagnetic layers is of homogeneous composition and its composition is that of the alloy having zero magnetostriction, minimum anisotropy and a minimum coercive field, while the other layer has a composition which varies in accordance with the thickness on either side of its mean composition which is substantially the same as that of the homogeneous layer, the non-homogeneous layer thus exhibiting zero magnetostriction, but higher anisotropy and a higher coercive field than the homogeneous layer;

One of the thin ferromagnetic layers, whose composition is nonhomogenous in the direction of the thickness, is obtained by the process forming the subject of the patent application filed today by the applicants for, "Improved Process for the Preparation of Thin Ferromagnetic Foils Having Predetermined Anisotropy and Thin Foils Obtained By This Process," and hereinafter referred to as the "first application";

One of these thin layers, which is of homogeneous composition, is obtained by the process forming the subject of the patent application filed today by the applicants for, "Improvements in Electrolytic Processes for the Production of Thin Ferromagnetic Films," and hereinafter referred to as the "second application."

The invention concerns more particularly a certain mode of application (that in which it is applied to the coupled thin layers employed in magnetic memories for nondestructive reading), as also certain embodiments of the said features, and it concerns more particularly still, as new industrial products, the coupled thin layers or foils obtained by the aforesaid process, as also the electrolytic installations suitable for producing them and the apparatus (notably magnetic memories and logic units) comprising such coupled thin layers.

In any case, the invention will be more readily understood with the aid of the following further description, which is given above all by way of indication.

Before the performance of the invention is described in detail, it will be pointed out on the one hand that the essential notions regarding ferromagnetic substances, which are necessary for an understanding of the invention, have been recalled in the aforesaid first application, and on the other hand there will be given in the following further particulars regarding the systems of coupled thin magnetic layers of the type described in the aforesaid "1964 Proceedings."

This publication discloses that when the thickness of an appropriate thin nonferromagnetic conductive layer disposed between two ferromagnetic layers having coercive fields of different values is below about 500 A., there occur between the two ferromagnetic layers magnetic interactions such that the magnetisation of one of the layers in one direction favours the magnetisation of the other layer in the same direction, the intensity of which interactions may be expressed by a quantity, similar to a magnetic field and referred to by the term "internal coupling field," which depends on the one hand upon the nature of the materials of which the ferromagnetic layers are constituted and upon their thickness, and on the other hand upon the nature and the thickness of the nonferromagnetic intermediate layer, so that its value can readily be adjusted.

In a particular embodiment according to the said publication, the system of the three layers comprises a first ferromagnetic layer having a weak coercive field, having a thickness of 1000 to 2000 A. and consisting of an iron-nickel alloy of the permalloy type comprising 81% of nickel and 19% of iron, an intermediate layer of a nonferromagnetic metal such as palladium, chromium, silver, gold or indium, of a thickness of less than 500 A., and a second ferromagnetic layer whose coercive field is essentially greater than that of the first layer, which second layer, which is 1800 A. thick, consists of an alloy of iron, nickel and cobalt having zero magnetostriction, these three layers being deposited by evaporation in vacuo in the presence of a magnetic field which induces an identical direction of uniaxial anisotropy for the two ferromagnetic layers.

In order to obtain different coercive fields, but the same zero magnetostriction, in the two ferromagnetic layers, the aforesaid publication proposes the use of two ferromagnetic alloys not having the same constituents, by reason of the fact that, of the alloys consisting of the same constituents, only one alloy of well-defined composition exhibits zero magnetostriction (for example the alloy containing 81%, or a little more, of nickel and 19%, or a little less, of iron in the case of nickel-iron alloys). This obligation also involves a relatively high coercive field for the layer of higher coercive field, because, of the ferromagnetic alloys, only the nickel-iron alloy of the aforesaid composition has both zero magnetostriction and a weak coercive field. The other ferromagnetic alloys, in particular the iron-nickel-cobalt alloy referred to in the said communication, exhibit a high coercive field and a high anisotropy field (the intensities of these two fields varying in the same sense), which necessitates high triggering control currents, notably for writing in the memory.

In addition, the process of preparation described in the aforesaid publication, i.e. evaporation in vacuo, which is generally carried out at a temperature of the order of 300° C., is likely to introduce a certain diffusion between the layers if it is not very carefully controlled.

Finally, in the aforesaid publication, the two ferromagnetic layers have a thickness equal to or greater than 1000 A. Now, applicants have found that, in order to have a good storage of information, it is very advantageous to give the ferromagnetic layers a thickness of less than 1000 A., and preferably to give the ferromagnetic field having a weak coercive field a thickness of less than 300 A., by reason of the fact that, beyond these thicknesses, the effect of displacement or creepage of the Bloch lines occurs, which effect brings about an erasure or, at least, a degradation of the stored information. In addition, greater thickness would be likely to produce demagnetising fields which reduce the density of the store information.

The present invention has for its object to provide improved coupled ferromagnetic layers. To this end, in accordance with the invention, and more particularly in accordance with that one of its modes of application and those embodiments of its various parts which appear to be preferable, the following procedure or a similar procedure is adopted for example, for producing coupled thin ferromagnetic foils.

There is provided a system of coupled ferromagnetic layers which consists of two thin layers of ferromagnetic alloy having substantially zero magnetostriction, which are separated by a thin nonferromagnetic conductive layer, and characterised by the fact that the two thin ferromagnetic layers consist of two alloys of the same metals, having different means compositions and different coercive fields.

More particularly, there may be deposited upon a support by electrolysis:

A first thin layer of a ferromagnetic alloy having nonminimum coercive field for the alloy under consideration, this layer having a composition which varies in the direction of the thickness on either side of the composition of the alloy having zero magnetostriction, A thin nonferromagnetic conductive layer, A second thin ferromagnetic layer whose composition, which is constant in the direction of the thickness, is that of the alloy having zero magnetostriction.

Ferromagnetic layers *a* and *b* are thus obtained, which have the following characteristics:

Very small thickness, notably less than 1000 A.,

Zero magnetostriction,

Different, but weak coercive fields of the two layers,

Different, but weak anisotropy fields of the two layers,

Very slight dispersion around the direction of easy magnetisation.

In addition, it is possible by electrolysis to produce an intermediate metallic layer *m* of variable and completely controllable thickness.

EXAMPLE

The layer of higher anisotropy field, called the "hard layer," is deposited by the process forming the subject of the said first application. This hard layer then consists of a thin ferromagnetic foil having simultaneously substantially zero magnetostriction and a nonminimum predetermined anisotropy field, the composition of the alloy varying in the direction of the thickness on either side of the particular composition corresponding to the zero value of the magnetostriction and also to the minimum value of the anisotropy field.

The operating conditions are advantageously adjusted to obtain a hard layer having a thickness of 100 A. to 1000 A., an anisotropy field substantially between 3 and 8 oersteds, and a microscopic angular dispersion not exceeding about 3°.

Such a layer is obtained more particularly in accordance with the first example of the said first application, i.e., with an electrolyte having the following composition (in grammes per litre):

| | |
|---|---|
| Sodium lauryl sulphate (wetting agent) | 0.420 |
| $FeSO_4.7H_2O$ | 9 |
| $NiSO_4.7H_2O$ | 220 |
| Cinchonine (regulator) | 0.100 |
| Boric acid (buffer) | 30 |
| pH | 2.5 |

under the following conditions: temperature, 28° C.; current density, 40 ma./cm.$^2$.

There is thus obtained a hard layer having a thickness of 800 A. to 900 A. and consisting of an alloy having a mean composition of 82–83% of nickel and 18–17% of iron, zero magnetostriction and an anisotropy field of 5.5 oersteds. The coercive field is 5.5 oersteds and the microscopic angular dispersion is 3°.

On the other hand, the hard layers of the prior art generally have a thickness of 1000 A. to 2000 A. and consist of a ternary iron-nickel-cobalt alloy, which results in an anisotropy field of the order of 18 oersteds.

The intermediate nonferromagnetic metallic layer *m* is formed, for example, of one of the following metals: gold, chromium, palladium, platinum, manganese, indium, and aluminium, for example (except in the case of aluminium) by means of a conventional electrolyte for the electrolytic deposition of such a metal, operating at ambient temperature, whereby any intermetallic diffusion is prevented. An intermediate layer, preferably of gold, having a predetermined thickness of less than 500 A. is deposited, the absolute value of the coupling fields ($h_{ab}$ of the ferromagnetic layer *a* on the ferromagnetic layer *b* and $h_{ba}$ of the layer *b* on the layer *a*) depending not only upon the nature of the metal of which the nonferromagnetic layer *m* consists, but also upon the thickness of this layer.

Finally, the "soft" ferromagnetic layer, which is preferably a layer of a thickness of less than 300 A., having substantially zero magnetostriction and a weak anisotropy field, is obtained by the electrolytic process forming the subject of the said second application, i.e., by employing an electrolyte having a high concentration of ions of the constituent metals of the alloy to be deposited, the ratio of the concentrations of the metallic ions of the electrolyte being substantially identical to the ratio of the concentrations of the metallic atoms of the alloy, and containing a certain quantity of an additive, such as thiourea, by means of which this identity of concentration can be precisely obtained.

The operating conditions are advantageously adjusted to obtain a soft layer of a thickness of less than 300 A., without any composition gradient, having zero magnetostriction, a minimum anistropy field and a microscopic angular dispersion of less than 3°.

More particularly, the electrolyte of the example of the said second patent application is employed, which has the following composition (in grammes per litre):

| | |
|---|---|
| Nickel sulphate $NiSO_4 \cdot 7H_2O$ | 462.5 |
| Iron sulphate $FeSO_4 \cdot 7H_2O$ | 98.7 |
| Boric acid $H_3BO_3$ (buffer) | 30 |
| Sodium lauryl sulphate (wetting agent) | 0.420 |
| Thiourea (regulator) | 0.250 |
| pH | 2.5 |

the operation being carried out with constant current (6.8 ma./cm.$^2$) at constant temperature (28° C. for the indicated quantity of thiourea) and without stirring, preferably in a nitrogen atmosphere.

There was thus obtained a soft layer consisting of an alloy of 82–83% of nickel and 18–17% of iron, with a thickness of 200 A., having zero magnetostriction and a microscopic angular dispersion equal to 3°; the anisotropy field and the coercive field were both of 2.5 oersteds.

On the other hand, and this is very important, the dispersion of the system of the three layers *a*, *m* and *b* is lowered to 1° (while each of the layers *a* and *b* had a dispersion of 3°).

Thus, regardless of the embodiment adopted, there are always produced coupled ferromagnetic foils or layers whose preparation is apparent with sufficient clarity from the foregoing to require no further description, and which have, as compared with the existing coupled layers of the type in question, many advantages, notably the following:

In the first place, the coupled layers are produced at ambient temperature or at a slightly higher temperature (up to about 55° C.), whereby any possibility of intermetallic diffusion is obviated.

The two ferromagnetic layers are produced from two alloys formed of the same constituents.

The two ferromagnetic layers have sufficiently weak anisotropy fields and coercive fields to permit memory control by weak currents.

These layers have at the same time zero magnetostriction.

The layer of weaker anisotropy, or the soft layer, may have a thickness of less than 300 A., so that excellent storage of information is possible.

Systems of coupled ferromagnetic layers may also be produced which have, for the whole, a very small microscopic angular dispersion.

As will be self-evident, and as will also be apparent from the foregoing, the invention is in no way limited to those modes of application or to those embodiments of its various parts which have been more particularly considered, but covers all variants thereof. In particular, it would be possible without departing from the scope of the invention to produce coupled layers having cylindrical geometry or to employ processes of deposition other than the electrolytic process.

What is claimed is:

1. A system comprising a nonmagnetic support, a first thin film and a second thin film superimposed upon said support and consisting of a ferromagnetic alloy of the same metals, said films being separated from each other by a thin conductive nonferromagnetic intermediate layer and exhibiting different coercive forces, said system being characterized in that said second film is of homogeneous composition and its composition is that of an alloy having a magnetostriction of substantially zero value, while said first film is of a nonhomogeneous composition which varies, in the direction of its thickness, on either side of a mean value corresponding to an alloy having a magnetostriction of substantially zero value, whereby said first film exhibits a magnetostriction of substantially zero value and a coercive force which is higher than that of said second film.

2. A system according to claim 1, wherein said ferromagnetic thin films are less than 1000 A. in thickness.

3. A system according to claim 1, wherein said second thin film is less than 300 A. in thickness.

4. A system according to claim 1, wherein the constituents of said ferromagnetic allow are nickel and iron and wherein the particular composition, which for the alloy exhibits a magnetostriction of substantially zero value, is 82–83% of nickel and 18–17% of iron.

5. A system according to claim 1, wherein said first ferromagnetic thin film has a content ratio of the constituents of said alloy which continuously varies in the direction of the thickness of the film.

6. A system according to claim 1, wherein said first ferromagnetic thin film comprises at least two superimposed layers, the composition of the alloy in each layer being constant and on either side of a mean value corresponding to zero magnetostriction, so that the resulting magnetostriction of said first film is of substantially zero value, but the anisotropy field has a higher value than that of an homogeneous foil of the alloy exhibiting a substantially zero magnetostriction.

7. A system comprising a nonmagnetic support, a first thin film and a second thin film superimposed upon said support and consisting of a ferromagnetic alloy of the same metals, said films being separated from each other by a thin conductive nonferromagnetic intermediate layer and exhibiting different coercive forces, said system being characterized in that the said second film is of homogeneous composition and its composition is 82–83% of nickel and 18–17% of iron, such that said second film exhibits a magnetostriction of substantially zero value, while the first film, consisting of a nickel-iron alloy, is of nonhomogeneous composition, and its composition varies, in the direction of its thickness, on either side of the composition containing 82–83% of nickel and 18–17% of iron, so that said first film exhibits a magnetostriction of substantially zero value and a coercive force which is higher than that of said second film.

8. A system according to claim 7, wherein said first film has a content ratio of nickel and iron, which continuously varies in the direction of thickness of the film.

9. A system according to claim 7, wherein said first film comprises two superimposed layers, the composition of the alloy in each layer being constant and on either side of the composition containing 82–83% of nickel and 18–17% of iron, so that the resulting magnetostriction of said first film is of substantially zero value, but the anisotropy field has a higher value than that of an homogeneous foil containing 82–83% of nickel and 18–17% of iron.

References Cited

UNITED STATES PATENTS

| | | | |
|---|---|---|---|
| 2,923,642 | 2/1960 | Hausen. | |
| 3,150,939 | 9/1964 | Wenner | 29—195 |
| 3,343,145 | 9/1967 | Bertelsen | 29—195 |
| 3,350,180 | 12/1967 | Croll | 29—195 |
| 3,375,091 | 3/1968 | Feldtkeller | 29—196.2 X |

HYLAND BIZOT, Primary Examiner

U.S. Cl. X.R.

29—194, 195